(12) United States Patent
Bonfiglio

(10) Patent No.: US 10,607,477 B2
(45) Date of Patent: Mar. 31, 2020

(54) HARDWIRE FIRE ALARM PANEL WALKTEST DECODER

(71) Applicant: Tyco Fire & Security GmbH, Neuhausen am Rheinfall (CH)

(72) Inventor: Jeffrey Bonfiglio, Ashland, OH (US)

(73) Assignee: JOHNSON CONTROLS FIRE PROTECTION LP, Boca Raton, FL (US)

( * ) Notice: Subject to any disclaimer, the term of this patent is extended or adjusted under 35 U.S.C. 154(b) by 0 days.

(21) Appl. No.: 15/633,111

(22) Filed: Jun. 26, 2017

(65) Prior Publication Data

US 2018/0374338 A1    Dec. 27, 2018

(51) Int. Cl.
*G08B 29/14* (2006.01)
*H04B 7/26* (2006.01)
*G08B 17/00* (2006.01)

(52) U.S. Cl.
CPC ............. *G08B 29/145* (2013.01); *H04B 7/26* (2013.01); *G08B 17/00* (2013.01)

(58) Field of Classification Search
CPC ......... G08B 29/145; G08B 17/00; H04B 7/26
See application file for complete search history.

(56) References Cited

U.S. PATENT DOCUMENTS

| 8,779,919 | B1 * | 7/2014 | Darling | G08B 27/00 340/539.16 |
| 2005/0280527 | A1 * | 12/2005 | Farley | G08B 29/145 340/514 |
| 2009/0287852 | A1 * | 11/2009 | Ho | G06F 13/385 710/15 |
| 2013/0205022 | A1 * | 8/2013 | Kagan | H04L 67/06 709/224 |
| 2016/0247385 | A1 * | 8/2016 | Stafford | G08B 25/08 |

* cited by examiner

*Primary Examiner* — James J Yang
*Assistant Examiner* — Kevin Lau
(74) *Attorney, Agent, or Firm* — Arent Fox, LLP

(57) ABSTRACT

Techniques for conducting, with a single human inspector, a walktest of a fire alarm system having a fire alarm control panel that does not include an RS232 interface are provided. A fire alarm control panel is coupled to a plurality of field devices. The fire alarm control panel provides an output signal identifying a zone of a field device when the field device is activated. A walktest decoder is coupled to the fire alarm control panel and is coupled to a computing device. The walktest decoder converts the output signal from the panel to a format for reception and processing by the computing device. A mobile computing device is wirelessly coupled to the computing device. The mobile computing device receives a wireless signal from the computing device indicating the identified zone. The mobile computing device is used by the inspector to determine if the correct zone was identified.

20 Claims, 4 Drawing Sheets

| Zone Number 302 | Zone Identification Code 304 | Description 306 |
|---|---|---|
| 1 | — | 1 long |
| 2 | — — | 2 long |
| 3 | — — — | 3 long |
| 4 | — — — — | 4 long |
| 5 | — — — — — | 5 long |

*400*

HARDWIRE FIRE ALARM PANEL WALKTEST DECODER

FIELD OF THE INVENTION

Embodiments generally relate to the field of alarm systems. More particularly, embodiments relate to techniques for performing a walktest of an alarm system.

DISCUSSION OF RELATED ART

Many fire alarm systems include a fire alarm control panel that provides an RS232 output connection. The RS232 output connection allows the fire alarm control panel to be directly connected to a computer. The directly connected computer can transmit the status of the fire alarm control panel to a remote inspector conducting a walktest of the fire alarm system. The RS232 output connection can therefore enable a walktest of the fire alarm system to be performed by a single inspector.

Other fire alarm systems often include a fire alarm control panel that does not provide an RS232 output connection. Conventionally, a walktest of a fire alarm system having a fire alarm control panel without an RS232 output connection is performed by two inspectors—a first inspector to activate remote field devices and a second inspector to monitor and report the status of the fire alarm control panel. Using two inspectors to conduct a walktest of a fire alarm system is both time-consuming and costly.

In view of the foregoing, there is a need for improved techniques to more quickly and efficiently conduct a walktest of a fire alarm system having a fire alarm control panel that may not provide an RS232 output connection or other direct connection to a computer.

SUMMARY OF THE INVENTION

Various embodiments provide techniques for conducting, with a single inspector, a walktest of a fire alarm system having a fire alarm control panel that does not include an RS232 interface. A fire alarm control panel is coupled to a plurality of field devices. The fire alarm control panel provides an output signal identifying a zone of a field device when the field device is activated. A walktest decoder is coupled to the fire alarm control panel and is coupled to a computing device. The walktest decoder converts the output signal from the fire alarm control panel to a format for reception and processing by the computing device. A mobile computing device is wirelessly coupled to the computing device. The mobile computing device receives a wireless signal from the computing device indicating the identified zone. The mobile computing device is used by the inspector to determine if the correct zone was identified. Other embodiments are disclosed and described.

BRIEF DESCRIPTION OF THE DRAWINGS

FIG. 3 illustrates an exemplary zone coding table 300.

DESCRIPTION OF EMBODIMENTS

Figure 1:
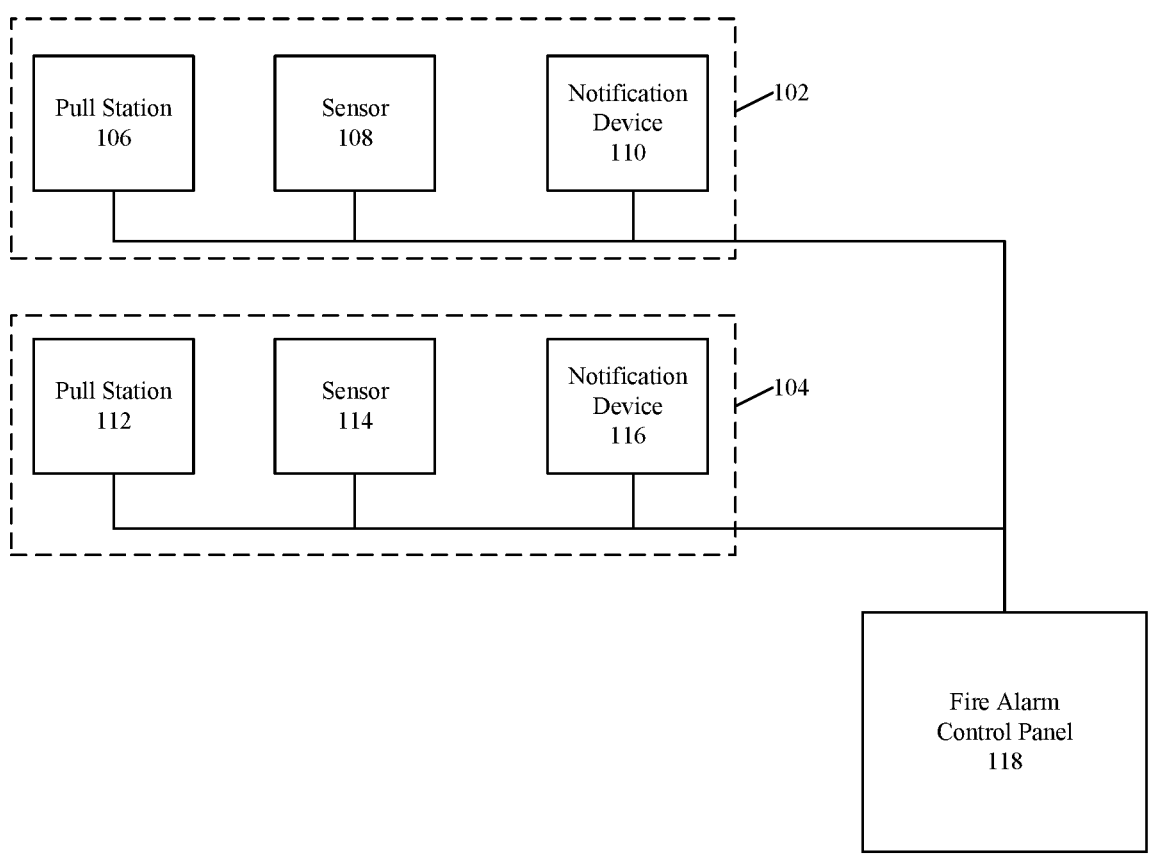
FIG. 1 illustrates an exemplary embodiment of a fire alarm system.

The present invention will now be described more fully hereinafter with reference to the accompanying drawings, in which preferred embodiments of the invention are shown. It will be appreciated, however, that the invention may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

FIG. 1 illustrates an exemplary embodiment of a fire alarm system 100. The fire alarm system 100 can be located in a building such as, for example, an industrial plant, an office, or a residential building. The fire alarm system 100 can warn occupants in the building and the local fire department of a potential fire emergency within the building.

The fire alarm system 100 can include a first zone 102 and a second zone 104. The first and second zones 102 and 104 can be located or positioned on the same floor of the building or on different floors. In general, the fire alarm system 100 can include any number of zones located across any number of floors of a building.

The first zone 102 can include a pull station 106, a sensor 108, and a notification device 110. The pull station 106 can be a wall-mounted device having a switch that can be manually activated to provide a fire alarm. The sensor 108 can be any type of sensor for detecting a potential fire emergency such as, for example, a smoke detector or a thermal detector. The notification device 110 can be an audio/visual device such as, for example, a horn, a bell, or a strobe light, or any combination thereof.

The second zone 104 can similarly include a pull station 112, a sensor 114, and a notification device 116. The pull stations 106 and 112 and the sensors 108 and 114 can be considered to be field devices used to detect a potential fire emergency. The pull stations 106 and 112 and the sensors 108 and 114 can be wired to a central fire alarm control panel 118. The notification devices 110 and 116 can also be wired to the fire alarm control panel 118. The pull stations 106 and 112 and the sensors 108 and 114 can generate and send a signal to the fire alarm control panel 118 when a potential fire emergency is detected by any of these devices. In response, the fire alarm control panel 118 can generate and send a signal to the notification device 110 and/or the notification device 116. Upon receipt of the response signal received from the fire alarm control panel, one or more of the notification device 110 and 116 can be activated, thereby altering the building occupants of the potential fire emergency.

As an example, the sensor 108 can detect a potentially hazardous situation such as, for example, the presence of smoke. In response to the detected condition, the sensor 108 can be "tripped" or triggered and can send a signal to the fire alarm control panel 118. The fire alarm control panel 118 can receive the signal and can determine that the signal was sent by the sensor 108 and/or sent from a field device located within the first zone 102. In response, the fire alarm control panel can send a signal to the notification device 110 to cause the notification device 110 to activate. When activated, the notification device 110 can provide an audio and/or a visual alarm to alert the occupants of the potentially hazardous situation.

The wired connections between the components of the first and second zones 102 and 104 and the fire alarm control panel 118 can be numerous and complex, with the complexity increasing significantly as more zones and/or components are added. To ensure the wiring is correct and that the fire alarm system 100 operates properly, the fire alarm system 100 can be tested. To test the fire alarm system 100, a walk through test or walktest can be conducted. During a walktest, the fire alarm control panel 118 can be placed into a test mode. A sensor (e.g., the sensor 108) or a pull station (e.g., the pulls station 106) can then be triggered and the corresponding signal generated in response can be verified as received at the fire alarm control panel 118. The walktest can also verify that the fire alarm control panel 118 generates and transmits an appropriate signal in response that identifies the field device or zone that transmitted the received signal, which can be used to activate an associated notification device (e.g., the notification device 110).

To conduct a walktest, often a first human operator (or inspector) is stationed at the fire alarm control panel 118 and a second human operator walks around the building triggering each field device one-by-one. When the second operator activates a field device, the first operator verifies receipt of the signal sent by the triggered field device at the fire alarm control panel 118. The second operator can then verify that the appropriate zone is activated by the fire alarm control panel in response. Conducting a walktest in this manner can be expensive and time-consuming, especially since it requires two human operators.

For newer fire alarm systems, the fire alarm control panel 118 can include a direct connection to a computing device such as, for example, a laptop, desktop, or tablet. The direct connection can be an RS232 connection. The direct RS232 connection can enable the walktest to be performed by a single operator. Specifically, alarm signals received by the fire alarm control panel 118 can be transmitted to the directly connected computing device that can transmit information regarding the operation of the fire alarm control panel 118 directly to the operator that travels around the building triggering the field devices. Accordingly, a second operator stationed at the fire alarm control panel is not needed.

For some fire alarm system—for example, some relatively older fire alarm systems—the fire alarm control panel 118 does not include a RS232 connection. This prevents a computing device from being directly connected to the fire alarm control panel 118 so that operation of the fire alarm control panel 118 can be remotely transmitted to the remote operator conducting the walktest. As a result, many relatively older fire alarm systems still require two operators to conduct the walktest, thereby increasing the costs and the total man hours needed to conduct the walktest.

Figure 2:
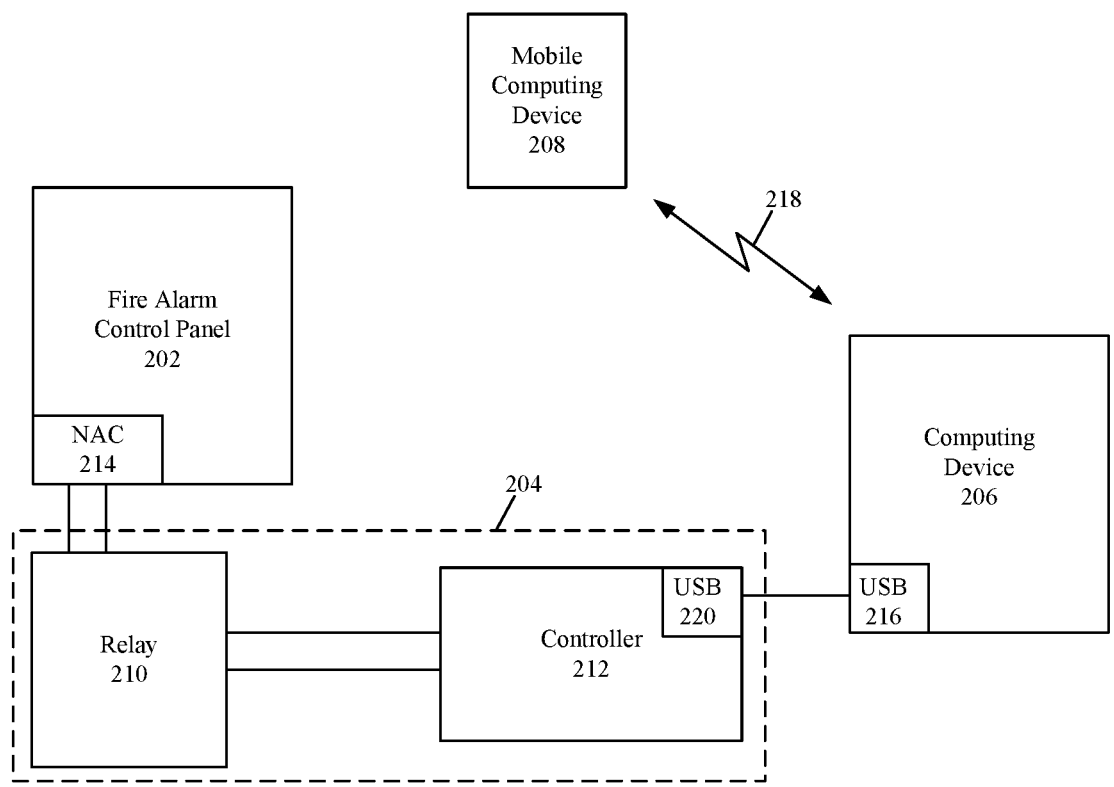
FIG. 2 illustrates an exemplary embodiment of a walktest system.

FIG. 2 illustrates an exemplary embodiment of a walktest system 200. The walktest system 200 can include a fire alarm control panel 202, a walktest decoder 204, a computing device 206, and a mobile computing device 208. The fire alarm control panel 202 can correspond to the fire alarm control panel 118 depicted in FIG. 1. The fire alarm control panel 202 can include an RS232 connection but generally the walktest system 200 is used when the fire alarm control panel 202 does not include an RS232 connection. Accordingly, exemplary operation of the walktest system 200 will be described herein based on the fire alarm control panel 202 not including an RS232 connection; however, it is to be understood that the fire alarm control panel 202 can include an RS232 connection.

The walktest decoder 204 can include a relay 210 and a controller 212. The relay 210 can be coupled to a notification appliance circuit (NAC) 214 of the fire alarm control panel 202 and can be coupled to the controller 212. In various embodiments, the relay 210 can be a PAM-4 relay. As a PAM-4 relay, a power input of the relay 210 can be directly connected to the NAC 214. The controller 212 can be a microcontroller or microprocessor. In various embodiments, the controller 212 can be an Ardunio UNO controller. As an Ardunio UNO controller, a common output of the relay 210 can be directly connected to the ground pin or input of the controller 212 and a normally open (NO) output of the relay 210 can be directly coupled to pin 7 of the controller 212.

The controller 212 can include a USB port or interface 220. The controller 212 can be coupled to the computing device 206 through the USB port 220 and a corresponding USB port 216 of the computing device 206. The computing device 206 can be any type of computing device such as, for example, a laptop computer, a desktop computer, or a tablet.

The mobile computing device 208 can be any mobile computing device such as, for example, a smartphone, a laptop computer, or a tablet. The mobile computing device 208 can be used and carried by the operator conducting a walktest. The computing device 206 and the mobile computing device 208 can communicate over a wireless interface 218. The wireless interface 218 can be any wireless interface operating according to any known wireless standard, network, or technology including, for example, any cellular wireless standard, WIFI, or Bluetooth.

Since the fire alarm control panel 202 may not include an RS232 connection, the fire alarm control panel 202 cannot be directly connected to the computing device 206. The walktest decoder 204 can be used to receive an output of the fire alarm control panel 202 and convert the signal into a form suitable for processing by the computing device 206. The computing device 206 can subsequently notify the mobile computing device 208 of the response signal issued by the fire alarm control panel 202, enabling the operator to complete the walktest in a more efficient manner. In general, the walktest decoder 204 receives a signal from the NAC 214 of the fire alarm control panel 202 and converts it to a form such that the computing device 206 can relay the status of the fire alarm control panel 202 to the operator's mobile computing device 208. This enables the operator to conduct a walktest of the fire alarm control panel 202 without audio and/or visual output disruptions.

To conduct a walktest using the walktest system 200, the operator can disable all unwanted outputs from the fire alarm control panel 202 except for one signal circuit. The remaining enabled circuit can be outputted by the NAC 214. The operator can remove the signal wires from the remaining enabled circuit and can couple them to the walktest decoder 204. The audible testing mode and/or audible walktest mode of the fire alarm panel 202 can then be activated.

After placing the fire alarm control panel 202 into a test mode, the operator can trigger a field device—for example, the pull station 106 depicted in FIG. 1. When the pull station 106 is triggered, a signal can be generated and transmitted by the pull station 106 and received by the fire alarm control panel 202. In response to the received signal, the fire alarm control panel 202 can output a signal from the NAC 214 to the walktest decoder 204. For example, the signal generated by the fire alarm control panel 202 can identify a zone (e.g., the first zone 102) in which the pull station 106 is located.

The signal outputted by the NAC 214 can be provided to the walktest decoder 204. Specifically, the signal can be provided to the relay 210. The relay 210 can provide the signal to the controller 212. The controller 210 can convert the output signal from the fire alarm control panel 202 to a form suitable for receipt by the computing device 206. As shown in FIG. 2, the controller 212 can convert the signal and can provide the converted signal to the computing device 206 over the USB port 220 for receipt by the USB port 216.

The information provided to the computing device 206 by the walktest decoder 204 can be a status of the fire alarm control panel 202. In various embodiments, the signal provided to the computing device 206 from the walktest decoder 204 can indicate a zone identified by the fire alarm control panel 202 in response to the received alarm signal. The computing device 206 can then relay this information over the wireless interface 218 to the mobile computing device 208. The controller 212 and/or the computing device 206 can store information regarding the results of each test—for example, time of the test and zone that was identified by the fire alarm control panel 202. Accordingly, the walktest decoder 204 enables the fire alarm control panel 202 to be inspected and tested by a single operator who can get real-time feedback on their mobile computing device 208 with minimal disruptions to the occupants of a building.

As shown in FIG. 2, the signal provided by the fire alarm control panel 202 in response to a field device being activated during a field test can be provided by the NAC 214. The output signal from the fire alarm control panel 202 can power the relay 210. The relay 210 can provide the signal from the fire alarm control panel 202 to the controller 212. The relay 210 can provide a replicated version of the signal from the fire alarm control panel 202 to the controller 212.

The signal from the fire alarm control panel 202 can specify a particular device to activate and/or can identify a zone. The controller 212 can decode the signal and can convert or reformat the signal for transmission to the computing device 206. Alternatively, or in addition thereto, the controller 212 can provide a replicated version of the signal within an acceptable format—for example, a USB format for transmission to the computing device 206.

The information received by the computing device 206 over the USB port 216 from the controller 212 can processed and conveyed to the mobile computing device 208. For example, the computing device 206 can send a signal to the mobile computing device 208 indicating what information was provided or outputted by the fire alarm control panel 202. Such information can include the particular device that was activated and/or can identify a zone that was activated. The mobile computing device 208 can include a program or application that can receive and process the signal from the computing device 206, enabling the mobile computing device 208 to determine a status of the fire control alarm panel 202 and/or any information provided in any signal outputted by the fire alarm control panel 202. The operator, based on information provided to the mobile computing device 208, can then determine if the fire alarm control panel 202 correctly responded (e.g., identified the correct zone). Shortly after the mobile computing device 208 receives the signal from the computing device 206, the fire alarm control panel 202 can reset automatically, to await another test by activation of another field device.

FIG. 3 illustrates an exemplary zone coding table 300. The zone coding table 300 can represent the signals provided by the fire alarm control panel 202 in response to an alarm condition from a field device to identify a particular zone.

As shown in FIG. 3, the zone coding table 300 includes a zone number field 302, a zone identification code field 304, and a description field 306. The zone coding table 300 can include signal coding for any number of codes. For purposes of explanation and illustration, five zone numbers and corresponding codes are shown in FIG. 3.

The zone number field 302 identifies a specific zone. The zone identification code field 304 specifies the code or signal pattern for a corresponding zone number. The description field 306 provides a textual description of a particular code. As an example, zone "1" can be identified by a signal comprising one long dash. The long dash can represent a signal pulse provided for a specified duration (e.g., a half second). Accordingly, zone "1" can be identified by the fire alarm control panel 202 by providing one signal pulse of a predetermined duration. As another example, zone "4" can be identified by a signal comprising 4 long dashes—i.e., four signal pulses each of the same duration with a short break between each pulse.

The signals shown in FIG. 3 can be provided by the NAC 214 in response to a sensed alarm condition from an activated field device. For example, if the sensor 114 in the second zone 104 is triggered by an operator, the sensor 114 will send a signal to the fire alarm control panel 202. Upon receipt of the signal, the fire alarm control panel 202 attempts to determine the zone location of the sensor 114. If the fire alarm control panel 202 is operating correctly, the fire alarm control panel 202 will identify the zone as the second zone 104 and will output a signal corresponding to two long dashes as shown in FIG. 3 for zone "2"—i.e., a signal pattern comprising two pulses. The signal can be provided by the fire alarm control panel 202 with the intention of identifying a particular zone. The signal is then provided to the walktest decoder 204 which converts the signal to a form that can be received by the computing device 206. The computing device 206 can then determine that the fire alarm control panel 202 generated a signal identifying the correct zone—i.e., zone "2". This information can then be conveyed to the operator by transmitting such information to the mobile computing device 208.

After the fire alarm control panel 202 issues a signal in response to a sensed alarm condition, the fire alarm control panel 202 can reset after a predetermined period of time (e.g., five seconds). After reset, the fire alarm control panel 202 is ready to be tested by activation of another field device. The zone coding table 300 is not limited to coding fields using only long dashes (i.e., pulses) but can also use any combination of long pulses (e.g., half second pulses), short pulses (e.g., quarter second pulses), or pauses to identify a specific zone.

Figure 4:
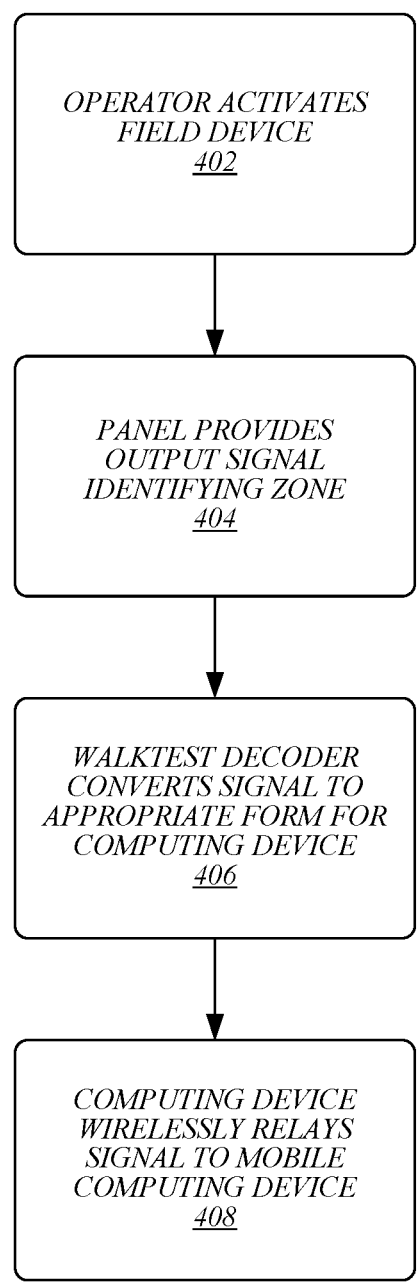
FIG. 4 illustrates a logic flow.

FIG. 4 illustrates a logic flow 400 for conducting a walktest with a walktest decoder (e.g., the walktest decoder 204). The walktest can be conducted on a fire alarm control panel (e.g., the fire alarm control panel 118/202) that either does not include an RS232 connection or without using a provided RS232 connection. The walktest can be conducted by a single human operator.

At 402, the operator can activate or trigger a field device. The field device can be, for example, a remote sensor (e.g., the sensor 108) or a pull station (e.g., the pull station 106). The field device can send a signal to the fire alarm control panel. The field device can send the signal over a wired connection to the fire alarm control panel. The fire alarm control panel can be placed in a test mode or a walktest mode prior to activation of the field device. Further, an audible walktest mode of the fire alarm control panel can be activated. The fire alarm control panel can receive the signal from the field device. The fire alarm control panel can process the signal to determine the specific field device that transmitted the signal, the location of the field device, and/or a zone in which the field device is located.

At 404, the fire alarm control panel can generate and provide an output signal. The output signal can indicate the specific activated field device, the location of the activated field device, and/or a zone in which the activated field device is located. The output signal can be provided by a NAC (e.g., the NAC 214). The output signal can be provided by a single enabled circuit while all other output circuits can be disabled. The output signal from the fire alarm control panel can be provided to the walktest decoder.

At 406, the walktest converter can receive the output signal from the fire alarm control panel and can convert the signal for delivery to a computing device (e.g., the computing device 206). The walktest converter can relay the information provided by the output signal from the fire alarm control panel to the computing device. The walktest converter can change a format of the output signal to a format that can be received and processed by the computing device. For example, the walktest decoder can provide the output signal to the computing device over a USB interface or an RS232 interface. In various embodiments, the walktest decoder can derive a new signal based on the fire alarm control panel output signal. Overall, the walktest decoder can provide a signal to the computing device that conveys the information provided in the fire alarm control panel output signal and/or status information of the fire alarm control panel.

At 408, the computing device can wirelessly relay information received from the walktest converter and/or the signal from the walktest converter to a mobile computing device (e.g., the mobile computing device 208). The operator can hold and use the mobile computing device during the walktest. The operator can determine if the fire alarm control panel responded correctly to the test field device activation based on the signal received by the mobile computing device from the computing device coupled to the walktest decoder. After confirming whether the fire alarm control panel operated properly—for example, by correctly identifying a zone in which the activated field device is located—the operator can test another field device.

In various embodiments the controller 212 can communicate directly with the mobile computing device 208 over the wireless interface 218, thereby obviating the need for the computing device 206. In various embodiments, the controller 212 and/or the computing device 206 can store information regarding the walktest including, for example, an identification of a triggered field device, a corresponding zone identified in response by the fire alarm control panel 202, and whether the identified zone was correct or incorrect.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A walktest system, comprising:
a fire alarm control panel coupled to a plurality of field devices and without a direct connection to a computing device, the fire alarm control panel configured to provide a panel output signal comprising a first format and identifying a zone of one of the plurality of field devices when the one of the plurality of field devices is activated during a test condition; and
a walktest decoder coupled with the fire alarm control panel, the walktest decoder comprising:
a relay; and
a controller having a ground pin or input that is directly coupled with a common output of the relay and having another pin that is directly connected to a normally open (NO) output of the relay, wherein the relay is configured to relay the panel output signal from the fire alarm control panel to the controller, wherein the controller is configured to convert the panel output signal from the first format to a second format to generate a decoder signal indicating the identified zone for transmission to the computing device.

2. The walktest system of claim 1, wherein the fire alarm control panel comprises a notification appliance circuit (NAC) to provide the panel output signal comprising the first format.

3. The walktest system of claim 2, wherein the relay is coupled to the NAC.

4. The walktest system of claim 3, wherein the panel output signal powers the relay.

5. The walktest system of claim 3, wherein a power input of the relay is directly connected to the NAC.

6. The walktest system of claim 1, wherein the controller is configured to convert the panel output signal from the fire alarm control panel to the second format for transmission over a USB interface.

7. The walktest system of claim 1, wherein the controller is configured to convert the panel output signal from the fire alarm control panel to the second format for transmission over an RS232 interface.

8. The walktest system of claim 1, wherein the computing device generates a wireless signal corresponding to the panel output signal from the fire alarm control panel.

9. The walktest system of claim 8, wherein the computing device is configured to transmit the wireless signal over a cellular network, a WIFI network, or a Bluetooth network.

10. A method for conducting a walktest, comprising:
activating a remote field device;
generating, at a fire alarm control panel without a direct output connection to a mobile computing device, an output signal comprising a first format and identifying a zone of the remote field device;
relaying, by a relay of a walktest decoder coupled with the fire alarm control panel, the output signal from the fire alarm control panel to a controller of the walktest decoder, the controller having a ground pin or input that is directly coupled with a common output of the relay and having another pin that is directly connected to a normally open (NO) output of the relay;
converting, by the controller of the walktest decoder, the output signal from the first format to a second format for receipt by the mobile computing device; and
wirelessly transmitting the converted output signal to the mobile computing device, the converted output signal indicating the identified zone.

11. The method of claim 10, wherein converting the output signal comprises converting the output signal to a USB signal.

12. The method of claim 10, wherein converting the output signal comprises converting the output signal to an RS232 signal.

13. The method of claim 10, wherein wirelessly transmitting comprises wirelessly transmitting the converted output signal over a cellular network, a WIFI network, or a Bluetooth network.

14. A walktest decoder, comprising:
a relay coupled to a notification appliance circuit (NAC) of a fire alarm control panel with a non-RS232 output connection to a computing device; and
a controller, coupled to an output of the relay, the controller having a ground pin or input that is directly coupled with a common output of the relay and having another pin that is directly connected to a normally open (NO) output of the relay, wherein the relay is configured to receive an output signal comprising a first format from the fire alarm control panel and provide the output signal to the controller, wherein the controller is configured to convert the output signal from the first format to a second format for receipt and processing by the computing device.

15. The walktest decoder of claim 14, wherein the second format is a USB format.

16. The walktest decoder of claim 14, wherein the second format is an RS232 format.

17. The walktest decoder of claim 14, wherein the controller is configured to wirelessly transmit the converted output signal to the computing device.

18. The walktest decoder of claim 17, wherein the computing device is a smartphone, a laptop computer, or a tablet.

19. The walktest system of claim 1, wherein the walktest decoder is directly connected to the computing device.

20. The walktest decoder of claim 14, wherein the walktest decoder is directly connected to the computing device.

* * * * *